(12) United States Patent
Lima et al.

(10) Patent No.: US 11,566,664 B2
(45) Date of Patent: Jan. 31, 2023

(54) CONNECTOR

(71) Applicant: REV ROBOTICS LLC, Carrollton, TX (US)

(72) Inventors: Francisco Musiol Lima, Carrollton, TX (US); Gregory Elliott Needel, Carrollton, TX (US); David Aaron Yanoshak, Carrollton, TX (US); Jonathan James Bryant, Carrollton, TX (US); Michael Andrew Kaurich, Carrollton, TX (US)

(73) Assignee: REV Robotics LLC, Carrollton, TX (US)

( * ) Notice: Subject to any disclaimer, the term of this patent is extended or adjusted under 35 U.S.C. 154(b) by 455 days.

(21) Appl. No.: 16/779,001

(22) Filed: Jan. 31, 2020

(65) Prior Publication Data

US 2021/0048066 A1 Feb. 18, 2021

(51) Int. Cl.
*F16C 29/02* (2006.01)
*F16B 7/00* (2006.01)

(52) U.S. Cl.
CPC .............. *F16C 29/02* (2013.01); *F16B 7/00* (2013.01)

(58) Field of Classification Search
CPC .................................. F16B 7/00; F16C 29/02
See application file for complete search history.

(56) References Cited

U.S. PATENT DOCUMENTS

| | | | |
|---|---|---|---|
| D335,624 S | * | 5/1993 | Siener .......................... D25/123 |
| 5,625,986 A | * | 5/1997 | Mansfield ............. E04F 13/068 52/351 |
| D419,858 S | | 2/2000 | Bosgoed |
| D471,991 S | * | 3/2003 | Maylon ........................ D25/119 |
| D488,055 S | | 4/2004 | Braak |
| D589,724 S | | 4/2009 | Howe et al. |
| D600,364 S | | 9/2009 | Boardman |
| D600,831 S | | 9/2009 | Munakata et al. |

(Continued)

FOREIGN PATENT DOCUMENTS

CA     2344813 A1     3/2000

OTHER PUBLICATIONS

Zhat Building Toys, 9 Hole U Channel, Date Visited: Jul. 28, 2021, Amazon, Date Available: 44362, https://www.amazon.co.uk/Zhat-Building-Different-Professional-Tetrixrobotics/dp/B09988WM4B (Year: 2021).

(Continued)

*Primary Examiner* — Matthew W Ing
(74) *Attorney, Agent, or Firm* — David W. Carstens; J. Andrew Reed; Carstens, Allen & Gourley, LLP

(57) ABSTRACT

A connector and associated system. In a first aspect, the connector comprises a patterned surface and a primary track. The patterned surface comprises a surface aperture pattern that is configured to receive at least one protruding element, the protruding element being configured to connect the connector to a first modular component. The primary track is connected to the patterned surface. The primary track can slidably engage a protruding element of a second modular component, thereby connecting the first modular component and the second modular component. In a second aspect, a system can comprise the connector, the first modular component and the second modular component.

20 Claims, 6 Drawing Sheets

(56) References Cited

U.S. PATENT DOCUMENTS

| | | | |
|---|---|---|---|
| D662,403 S | | 6/2012 | Page |
| D669,769 S | | 10/2012 | Lapping et al. |
| 8,277,358 B2 | | 10/2012 | Gasparrini et al. |
| D745,299 S | | 12/2015 | Chang |
| D747,127 S | | 1/2016 | Chang |
| D754,366 S | | 4/2016 | Morton |
| D757,297 S | | 5/2016 | Che |
| D767,165 S | | 9/2016 | Che |
| D800,344 S | * | 10/2017 | Apanovich .................. D25/119 |
| D800,345 S | * | 10/2017 | Apanovich .................. D25/119 |
| D800,346 S | * | 10/2017 | Apanovich .................. D25/119 |
| D800,921 S | * | 10/2017 | Apanovich .................. D25/119 |
| D892,599 S | | 8/2020 | Witherbee |
| 10,731,335 B2 | * | 8/2020 | Baltz, Jr. ............... E04B 1/7038 |
| D909,618 S | | 2/2021 | Zhao |
| D915,283 S | | 4/2021 | Steininger |
| D917,731 S | | 4/2021 | Nelson et al. |
| D920,769 S | | 6/2021 | Kovacs |
| D922,615 S | | 6/2021 | Springborn |
| 11,180,913 B2 | * | 11/2021 | Baltz, Jr. ............... E04F 13/007 |
| 2013/0040777 A1 | | 2/2013 | Gassmann et al. |
| 2014/0371028 A1 | | 12/2014 | Billmeyer |
| 2016/0340908 A1 | * | 11/2016 | Apanovich ............. E04F 21/02 |
| 2018/0216663 A1 | * | 8/2018 | Korn ....................... F16C 29/02 |

OTHER PUBLICATIONS 1121 series Low-Side U-Channel (9 Hole, 240mm Length—goBILDA, Date Visited Jul. 28, 2021, Go Bilda, Date Available: Jul. 28, 2021, https://www.gobilda.com/1121-series-low-side-u-channel-9-hole-240mm-length/ (Year: 2021).

45mm U Channel—152mm—REV Robotics, Date Visited: Jul. 28, 2021, Rev Robotics, Date Available: Jul. 28, 2021, https://www.revrobotics.com/rev-41-1750/ (Year: 2021).

45mm × 15mm C Channel—152mm—REV Robotics, Date Visited: Jul. 28, 2021, Rev Robotics, Date Available: Jul. 28, 2021, https://www.revrobotics.com/rev-41-1770/ (year: 2021).

C Channel Bundle—REV Robotics, Date Visited: Jul. 28, 2021, Rev Robotics, Date Available: Jul. 28, 2021, https://www.revrobotics.com/rev-45-1896/ (year: 2021).

U-Channel (19 Hole, 15.00_Length—ServoCity, Date Visited Jul. 28, 2021, Servo City, Date Available: Jun. 18, 2014, https://www.servocity.com/15-00-aluminum-channel/ (Year: 2014).

Minifinker 3120 Series U-Channel, Date Visited: Jul. 28, 2021, Amazon, Date Available: Jul. 8, 2021, https://www.amazon.co.uk/minifinker-U%E2%80%91Channel-Accessories-Estates-Gobilda/ (Year: 2021).

U-Channel (9 Hole, 7.50_ Length_—ServoCity, Date Visited Jul. 28, 2021, Date Available: Jun. 18, 2014, https://www.amazon.co.uk/minifinker-U%E2%80%91Channel-Accessories-Estates-Gobilda/ (Year: 2014).

* cited by examiner

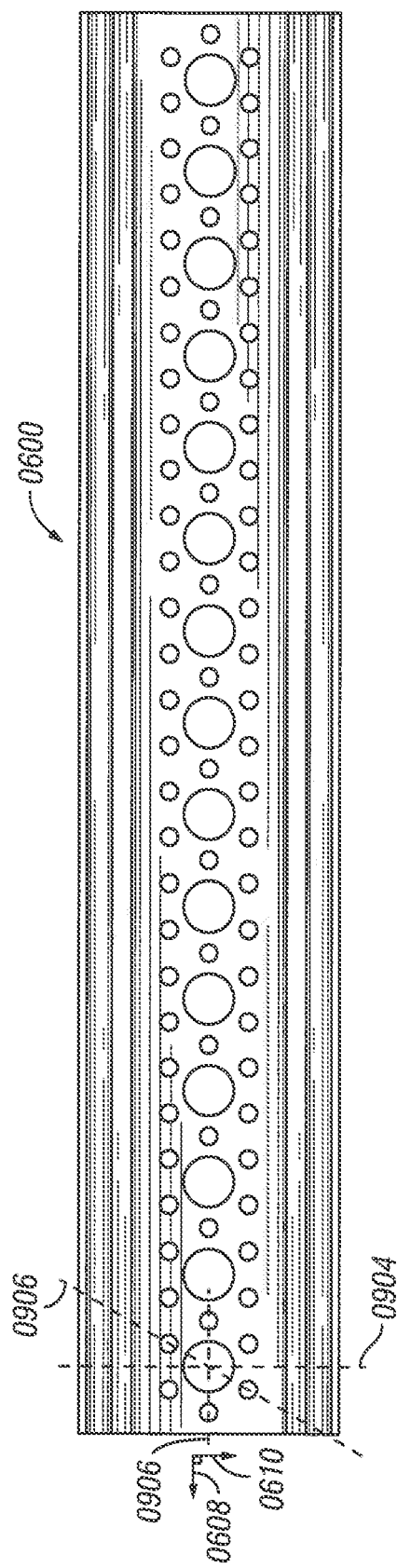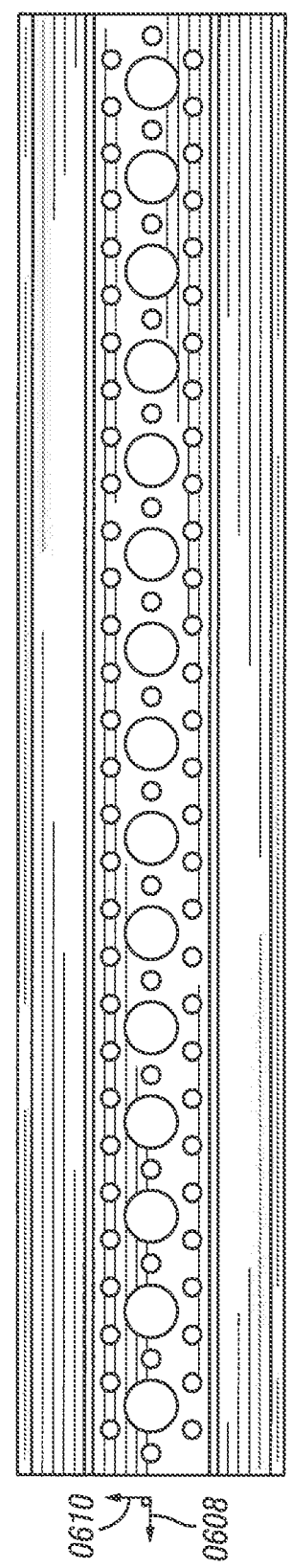

CONNECTOR

CROSS-REFERENCE TO RELATED APPLICATIONS

This application claims priority to U.S. Provisional Application No. 62/888,255, filed Aug. 16, 2019, entitled "Connector." Each application listed in this paragraph is hereby incorporated by reference in its entirety as an example.

BACKGROUND OF THE INVENTION

Technical Field

In some aspects, the present invention relates to a connector. In some aspects, the present invention relates to a system comprising the connector, which system can include a protrusion that is configured to engage the connector and link the connector and another component. In some aspects, the present invention relates to a system comprising the connector, which system can include at least two protrusions, with a first protrusion being configured to be inserted into an aperture in the connector, thereby linking the connector to a first component, and with a second protrusion being configured to slidably engage a track on the connector and thereby link the connector and a second component.

Description of Related Art

Existing techniques and devices for connecting components lack desirable attributes, for example, ease of use, low cost, ease of manufacture, durability, modularity in terms of allowing various components to be connected with various types of connections, interchangeability with other connectors, interchangeability of the connected components, and combinability of connectors and components into larger structures. For example, existing devices are difficult to use, expensive, difficult to manufacture, lacking in durability, non-modular, non-interchangeable, and non-combinable.

SUMMARY OF SELECTED EMBODIMENTS OF THE INVENTION

In accordance with a first embodiment, a connector is provided. The connector comprises a patterned surface and a primary track. The patterned surface comprises a surface aperture pattern that is configured to receive at least one protruding element, the protruding element being configured to connect the connector to a first modular component. The primary track is connected to the patterned surface.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

FIG. 9 is a top view of the connector of FIG. 6.

FIG. 10 is a bottom view of the connector of FIG. 6.

DETAILED DESCRIPTION

In some embodiments, a connector and associated system described in the present application can solve one or more problems. For example, in some embodiments, when compared to existing devices and techniques used to connect components, the connector is, for example, easier to use, less expensive, easier to manufacture, more durable, more modular in terms of allowing various components to be connected with various types of connections, and more interchangeable with other connectors. As further examples, in some embodiments, when compared to existing devices and techniques used to connect components, the connector enables greater interchangeability of connected components and greater combinability of connectors and components into larger structures.

Figure 1:
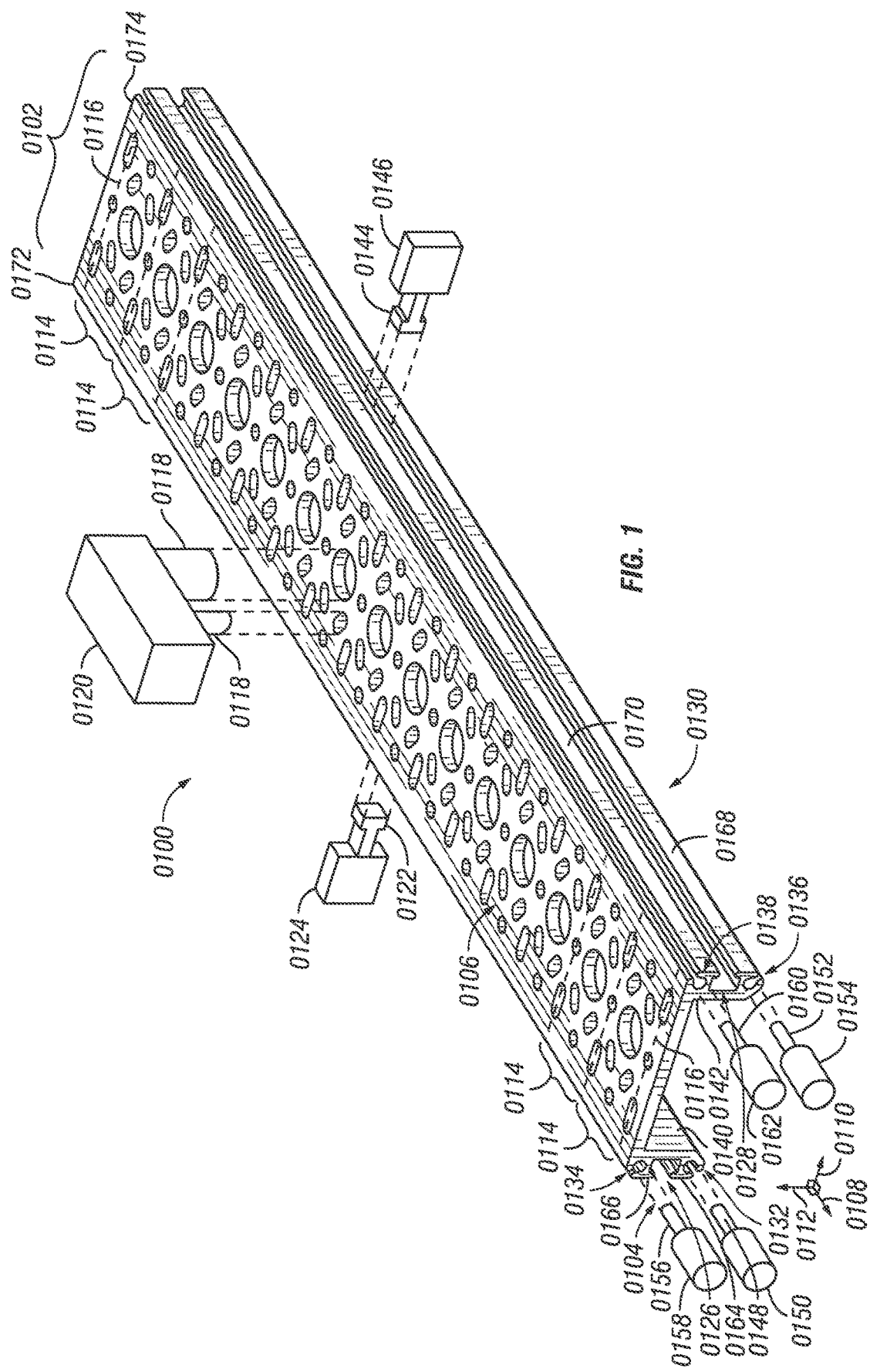
FIG. 1 is a perspective view taken from the front, the top and the right of a connector, the connector forming a C-shaped channel, and the terms front, top and right being for reference only as the connector can be placed in any orientation with respect to vertical or horizontal.
Figure 2:
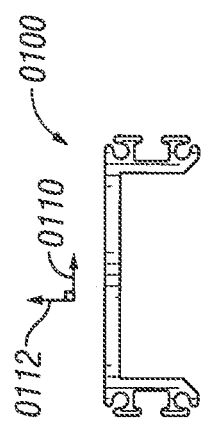
FIG. 2 is a front view of the connector of FIG. 1, the rear view being a mirror image.
Figure 3:
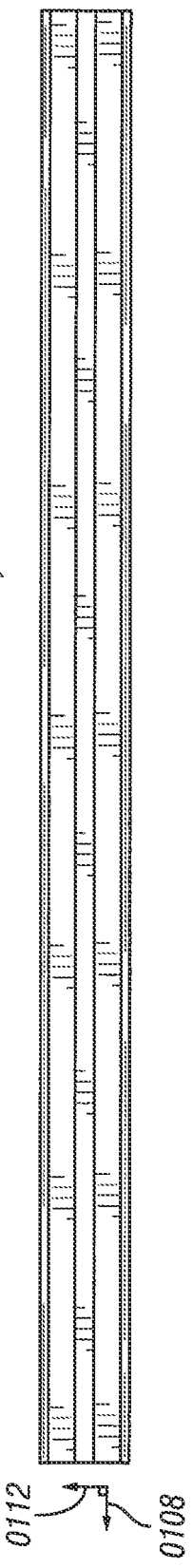
FIG. 3 is a right side view of the connector of FIG. 1, the left side view being a mirror image.
Figure 4:
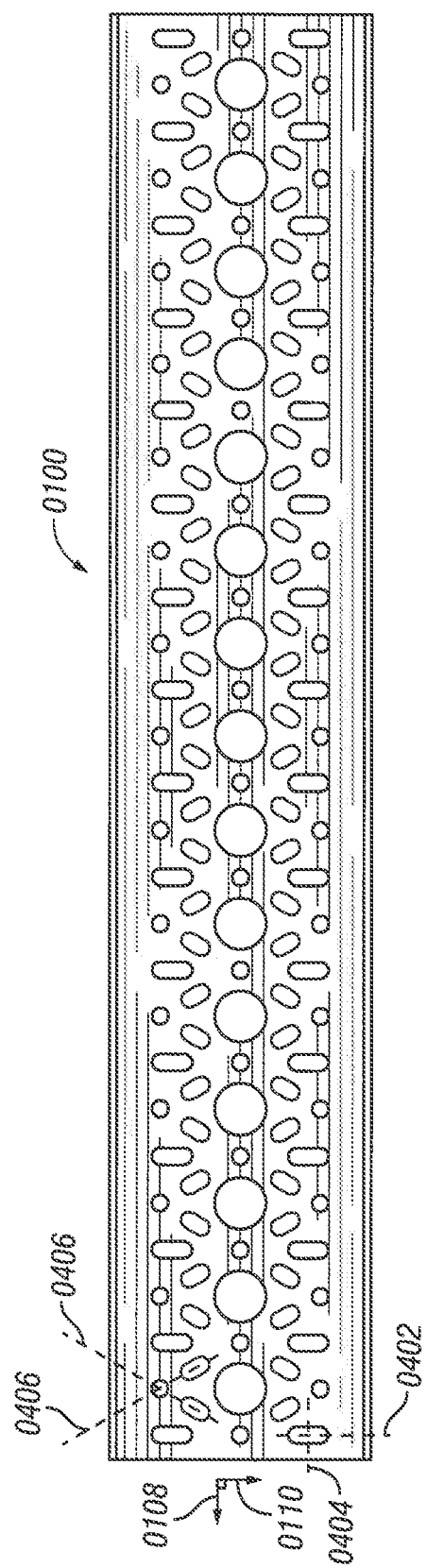
FIG. 4 is a top view of the connector of FIG. 1.
Figure 5:
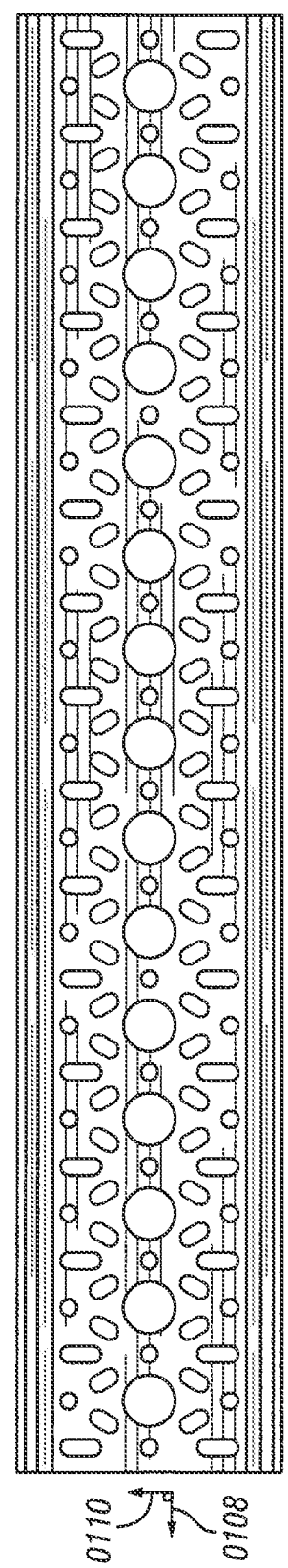
FIG. 5 is a bottom view of the connector of FIG. 1.
Figure 6:
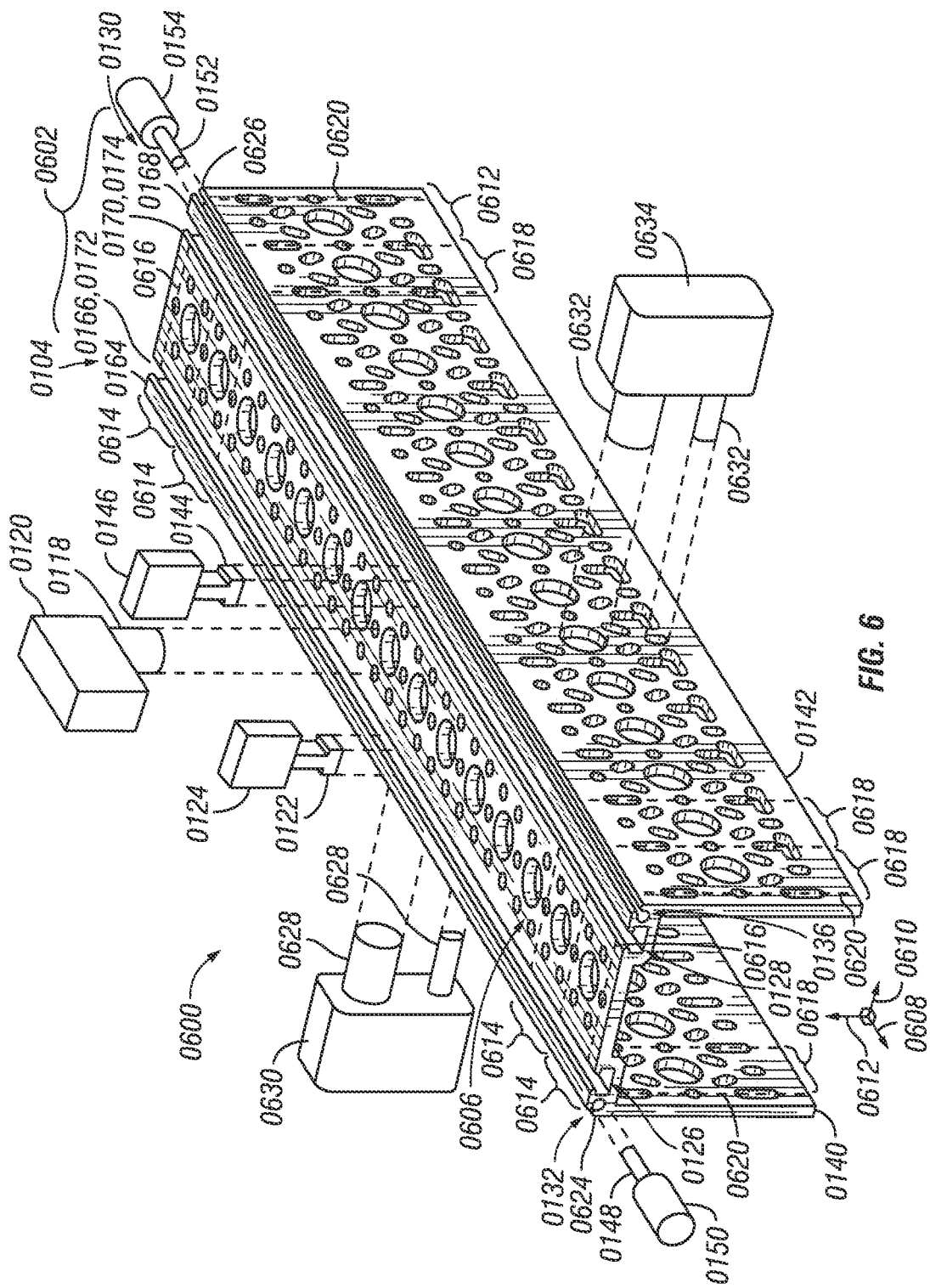
FIG. 6 is a perspective view taken from the front, the top and the right of a connector, the connector forming a U-shaped channel, and the terms front, top and right being for reference only as the connector can be placed in any orientation with respect to vertical or horizontal.
Figure 7:
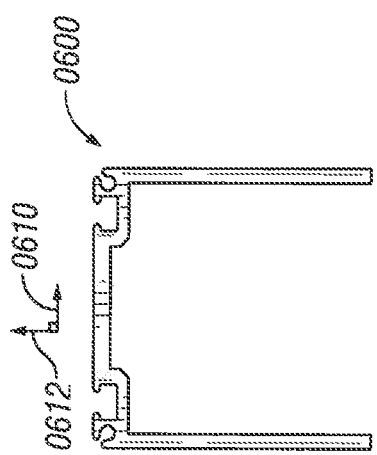
FIG. 7 is a front view of the connector of FIG. 6, the rear view being a mirror image.

Referring now to FIG. 1 and FIG. 6, a perspective view of two embodiments of a connector 0100, 0600 are provided. For purposes of description, the Brief Description of FIG. 1 and FIG. 6 includes reference to a top, bottom, front, rear, right side, and left side of a connector 0100, 0600. Nonetheless, in this context, the terms top, bottom, front, rear, left and right are used for ease of reference with respect to the figures and do not require the connector 0100, 0600 to actually be placed in any particular orientation relative to vertical or horizontal.

With reference to FIG. 1 and FIG. 6, a connector 0100, 0600 can comprise a patterned surface 0102, 0602 and a primary track 0104, or both a primary track 0104 and a secondary track 0130. The primary track 0104 can be located on a first wall 0140, the secondary track 0130 can be located on a second wall 0142, or if both tracks are used, each track can be located on its respective wall. Optionally, this configuration can be used in conjunction with a connector having a C-shaped channel. As another option, the primary track 0104, the secondary track 0130, or both can be located on the patterned surface 0102, 0602. Optionally, this configuration can be used in conjunction with a connector having a U-shaped channel.

As would be evident to a skilled person reading the present disclosure, the connector the connector 0100, 0600 can be integral so that the connector 0100, 0600 consists of a single piece. Additionally, as the skilled person would understand, the connector 0100, 0600 can be made by extruding a material and perforating the material to provide the patterned surface 0102, 0602. Optionally, the connector 0100, 0600 can be made from a polymer (e.g., thermoplastic polymer).

With reference to FIG. 1 and FIG. 6, the patterned surface 0102, 0602 of the connector can comprise a surface aperture pattern 0114, 0614, the surface aperture pattern 0114, 0614 being configured to receive at least one protruding element 0118. Optionally, the protruding element 0118 can be configured to connect the connector 0100, 0600 to a first modular component 0120.

With reference again to FIG. 1 and FIG. 6, the primary track 0104 can be connected to the patterned surface 0102, 0602.

A pattern on the pattern surface can take various forms. In some embodiments, the patterned surface 0102, 0602 comprises apertures that are symmetrical across a transverse aperture axis of symmetry 0402, 0902 parallel to the transverse direction 0110, 0610. In some embodiments, the apertures that are symmetrical across a longitudinal aperture axis of symmetry 0404, 0904 parallel to the longitudinal direction 0108, 0608. Optionally, the apertures are symmetrical across an oblique aperture axis of symmetry 0406, 0906 that is not parallel to the longitudinal direction 0108, 0608 or the transverse direction 0110, 0610. In some embodiments, the apertures can be circular apertures 0106, 0606, circular apertures having a plurality of diameter sizes, a series of apertures of the same kind that are arranged in a pattern along the length of the patterned surface 0102, 0602, a pattern of apertures of different kinds that repeat along the length of the patterned surface 0102, 0602, apertures with edges that are rounded where the edges meet, apertures without corners, or a combination thereof.

With reference to FIG. 1 and FIG. 6, the patterned surface 0102, 0602 has a length that extends in a longitudinal direction 0108, 0608, a width extends in a transverse direction 0110, 0610, and a thickness extends in a normal direction 0112, 0612. As illustrated, the longitudinal direction is a direction of extrusion of the connector, or a quasi-extrusion-direction. For example, the quasi-extrusion direction is similar to a direction of extrusion of the connector. Along the quasi-extrusion-direction, the connector has a constant or essentially constant cross-section. For example, the latter can be a useful description for a molded device that is not actually extruded but could have been formed by extruding the body of the connector and perforating the body to form the apertures in the body. In embodiments where there is no discernible direction of extrusion or quasi-extrusion direction, the longitudinal direction can be the direction of a line containing the furthest possible distance between two points on the patterned surface. With reference again to FIG. 1 and FIG. 6, the transverse direction 0110, 0610 is perpendicular to the longitudinal direction 0108, 0608, the normal direction 0112, 0612 is perpendicular to the longitudinal direction 0108, 0608 and the transverse direction 0110, 0610. Optionally, the length is greater than or equal to the width. Optionally, the width is greater than the thickness.

With reference to FIG. 1 and FIG. 6, in some embodiments, the surface aperture pattern 0114, 0614 of the patterned surface 0102, 0602 repeats (e.g., in the longitudinal direction 0108, 0608) to provide a plurality of surface aperture patterns 0114, 0614. Optionally, each complete surface aperture pattern 0114, 0614 in the plurality of surface aperture patterns 0114, 0614 is identical within a tolerance of 10, 9, 8, 7, 6, 5, 4, 3, 2 or 1% by area, the tolerance being measured by (i) creating a superimposed image of any secondary surface aperture pattern 0114, 0614 in the plurality of surface aperture patterns 0114, 0614 over any primary surface aperture pattern 0114, 0614 in the plurality of surface aperture patterns 0114, 0614, (ii) identifying a first set of mismatched areas of the superimposed image where the primary surface aperture pattern 0114, 0614 has a void area but the secondary surface aperture pattern 0114, 0614 has a filled area, (iii) identifying a second set of mismatched areas of the superimposed image where the primary surface aperture pattern 0114, 0614 has a filled area but the secondary surface aperture pattern 0114, 0614 has a void area, (iv) summing the area of the first set of mismatched areas and the second set of mismatched areas to provide a sum, (v) dividing the sum by two to provide a quotient (v) dividing the quotient by the total area of the surface aperture pattern 0114, 0614.

In some embodiments, the longitudinal distance between each surface aperture pattern 0114, 0614 in the plurality of surface aperture patterns 0114, 0614 is identical. In some embodiments, the surface aperture pattern is a primary surface aperture pattern and apertures at the edge 0116, 0616 of the primary surface aperture pattern can be completed, for example, as they would appear if a secondary surface aperture pattern were placed adjacent to the primary surface aperture pattern to continue the patterned surface, the primary surface aperture pattern and the secondary surface aperture pattern having the same orientation and differing only in displacement in the longitudinal direction. In some embodiments, each surface aperture pattern 0114, 0614 in the plurality of surface aperture patterns 0114, 0614 abuts an adjacent surface aperture pattern 0114, 0614 in the plurality of surface aperture patterns.

With reference to FIG. 1 and FIG. 6, the surface aperture pattern 0114, 0614 can be configured to receive at least one protruding element 0118. In some embodiments, the protruding element in the at least one protruding element 0118 is configured to rotatably connect the connector 0100, 0600 to the first modular component 0120. Optionally, the at least one protruding element 0118 is configured to slidably connect the connector 0100, 0600 to the first modular component 0120. In some embodiments, a protruding element in the at least one protruding element 0118 and the first modular component 0120 are able to slide at least partly in the transverse direction 0110, 0610, at least partly in the longitudinal direction 0108, 0608, at least partly in the normal direction 0112, 0612, or a combination thereof. In some embodiments, the at least one protruding element 0118 is configured to immobilize the connector 0100, 0600 relative to a point on the first modular component 0120.

With reference to FIG. 1 and FIG. 6, in some embodiments, the primary track 0104 is configured to slidably engage a primary track protrusion 0122, the primary track protrusion 0122 configured to connect a second modular component 0124 to the connector 0100, 0600. Optionally, the primary track 0104 comprises a primary track void 0126 (e.g., primary T-shaped void), the primary track void 0126 configured to slidably engage the primary track protrusion 0122.

With reference again to FIG. 1 and FIG. 6, the primary track 0104 can comprise a primary track void 0126 (e.g., primary T-shaped void). Optionally, the primary track void extends in the longitudinal direction 0108, 0608 or within 45, 40, 35, 30, 25, 20, 15, 10, 9, 8, 7, 6, 5, 4, 3, 2 or 1 degrees of the longitudinal direction 0108, 0608. The primary track void is configured to slidably engage a primary track protrusion 0122 (e.g., primary T-shaped protrusion), and the primary track protrusion 0122 (e.g., the primary T-shaped protrusion) is configured to connect a second modular component 0124 to the connector 0100, 0600.

In some embodiments, the primary track 0104 comprises a primary first rounded void 0132 (e.g., cylindrically shaped void). Optionally, the primary first rounded void extends in the longitudinal direction 0108, 0608 or within 45, 40, 35, 30, 25, 20, 15, 10, 9, 8, 7, 6, 5, 4, 3, 2 or 1 degrees of the longitudinal direction 0108, 0608. The primary first rounded void is configured to slidably engage a primary first rounded protrusion 0148 (e.g. cylindrically shaped protrusion). Optionally, the primary first rounded protrusion 0148 is configured to connect a fourth modular component 0150 to the connector 0100, 0600. In some embodiments, the primary first rounded void 0132 is distal relative to the primary track void 0126.

With reference to FIG. 1 and FIG. 6, in some embodiments, the connector 0100, 0600 comprises a secondary track 0130. In some embodiments, the secondary track 0130 is configured to slidably engage a secondary track protrusion 0144, the secondary track protrusion 0144 configured to connect a third modular component 0146 to the connector 0100, 0600. Optionally, the secondary track 0130 comprises a secondary track void 0128, the secondary track void 0128 configured to slidably engage the secondary track protrusion 0144.

In some embodiments of a connector, the secondary track 0130 comprises a secondary track void 0128 (e.g., secondary T-shaped void). Optionally the secondary track void 0128 extends in the longitudinal direction 0108, 0608 or within 45, 40, 35, 30, 25, 20, 15, 10, 9, 8, 7, 6, 5, 4, 3, 2 or 1 degrees of the longitudinal direction 0108, 0608). The secondary track is configured to slidably engage a secondary track protrusion 0144 (e.g., secondary T-shaped protrusion), which protrusion can be configured to connect a third modular component 0146 to the connector 0100, 0600.

In some embodiments of a connector, the secondary track 0130 comprises a secondary first rounded void 0136 (e.g., cylindrically shaped void). Optionally, the secondary first rounded void 0136 extends in the longitudinal direction 0108, 0608 or within 45, 40, 35, 30, 25, 20, 15, 10, 9, 8, 7, 6, 5, 4, 3, 2 or 1 degrees of the longitudinal direction 0108, 0608. The secondary first rounded void 0136 is configured to slidably engage a secondary first rounded protrusion 0152 (e.g. cylindrically shaped protrusion). Optionally, the secondary first rounded protrusion 0152 configured to connect a fifth modular component 0154 to the connector 0100, 0600. In some embodiments, the secondary first rounded void 0136 is distal relative to the secondary track void 0128.

With reference to FIG. 1 and FIG. 6, in some embodiments, the connector 0100, 0600 comprises a first wall 0140 fixed to the patterned surface 0102, 0602 and extends at least partly in the normal direction 0112, 0612. Optionally, the first wall 0140 extends in a direction within 45, 40, 35, 30, 25, 20, 15, 10, 9, 8, 7, 6, 5, 4, 3, 2 or 1 degrees of the normal direction 0112, 0612. In some embodiments, the first wall 0140 is connected to the patterned surface 0102, 0602 at a first edge of the patterned surface 0102, 0602.

With reference to FIG. 1 and FIG. 6, in some embodiments, the first wall 0140 comprises a planar portion. Optionally, the planar portion of the first wall 0140 extends in a direction within 45, 40, 35, 30, 25, 20, 15, 10, 9, 8, 7, 6, 5, 4, 3, 2 or 1 degrees of the normal direction 0112, 0612. In some embodiments, the planar portion of the first wall 0140 is connected to the patterned surface 0102, 0602 at a first edge of the patterned surface 0102, 0602.

With reference to FIG. 1 and FIG. 6, in some embodiments, the connector 0100, 0600 comprises a second wall 0142 fixed to the patterned surface 0102, 0602 and extends at least partly in the normal direction 0112, 0612. Optionally, the second wall 0142 extends in a direction within 45, 40, 35, 30, 25, 20, 15, 10, 9, 8, 7, 6, 5, 4, 3, 2 or 1 degrees of the normal direction 0112, 0612. The second wall 0142 can be connected to the patterned surface 0102, 0602 at a second edge of the patterned surface 0102, 0602. The second edge of the patterned surface 0102, 0602 can be opposite the first edge of the patterned surface 0102, 0602. Optionally, the first edge of the patterned surface 0102, 0602 and the second edge of the patterned surface 0102, 0602 are separated by the width of the patterned surface 0102, 0602. In some embodiments, the second wall 0142 is within 45, 40, 35, 30, 25, 20, 15, 10, 9, 8, 7, 6, 5, 4, 3, 2 or 1 degrees of the normal direction 0112, 0612.

In some embodiments of a connector, the second wall 0142 comprises a planar portion. Optionally, the planar portion of the second wall 0142 extends in a direction within 45, 40, 35, 30, 25, 20, 15, 10, 9, 8, 7, 6, 5, 4, 3, 2 or 1 degrees of the normal direction 0112, 0612. Optionally, the planar portion of the second wall 0142 is connected to the patterned surface 0102, 0602 at a second edge of the patterned surface 0102, 0602. In some embodiments, the second edge of the patterned surface 0102, 0602 is opposite the first edge of the patterned surface 0102, 0602. In some embodiments, the first edge of the patterned surface 0102, 0602 and the second edge of the patterned surface 0102, 0602 are positioned across the width of the patterned surface 0102, 0602. Optionally, the planar portion of the second wall 0142 is within 45, 40, 35, 30, 25, 20, 15, 10, 9, 8, 7, 6, 5, 4, 3, 2 or 1 degrees of the normal direction 0112, 0612.

With reference to FIG. 1 and FIG. 6, in some embodiments, the connector 0100, 0600 forms a channel comprising the patterned surface 0102, 0602, the first wall 0140 and the second wall 0142.

With reference again to FIG. 1 and FIG. 6, in some embodiments, the first modular component 0120 is not the second modular component 0124, the third modular component 0146, the fourth modular component 0150, the fifth modular component 0154 or a combination thereof. Nonetheless, in some embodiments, the first modular component 0120 is: the second modular component 0124, the third modular component 0146, the fourth modular component 0150, the fifth modular component 0154 or a combination thereof.

With reference to FIG. 1, in some embodiments, the first wall 0140 of the connector comprises the primary track 0104. In some embodiments, the primary track 0104 comprises a primary second rounded void 0134 (e.g., cylindrically shaped void). Optionally, the primary track 0104 extends in the longitudinal direction 0108 or within 45, 40, 35, 30, 25, 20, 15, 10, 9, 8, 7, 6, 5, 4, 3, 2 or 1 degrees of the longitudinal direction 0108. The primary track 0104 can be configured to slidably engage a primary second rounded protrusion 0156 (e.g. cylindrically shaped protrusion), which can be configured to connect a sixth modular component 0158 to the connector 0100. Optionally, the primary second rounded void 0134 is positioned at a proximal edge of the primary track 0104 and the primary first rounded void 0132 is positioned at a distal edge of the primary track 0104. Optionally, the primary track void 0126 is positioned between the primary first rounded void 0132 and the primary second rounded void 0134. In some embodiments, the primary second rounded protrusion 0156 is proximal relative to the primary track void 0126 (e.g., primary T-shaped void).

With reference again to FIG. 1, in some embodiments of a connector, the primary track 0104 comprises a primary first rail 0164, a primary second rail 0166 or both. Optionally, the primary first rail 0164 and the primary second rail 0166 are configured to jointly slidably engage the primary track protrusion 0122 (e.g., primary T-shaped protrusion). In some embodiments, the primary first rail 0164 is positioned between the primary first rounded void 0132 and the primary track void 0126 (e.g., primary T-shaped void). In some embodiments, the primary first rail 0164 forms a wall for both the primary first rounded void 0132 and the primary track void 0126 (e.g., primary T-shaped void). Optionally, the primary first rail 0164 extends in the longitudinal direction 0108 or within 45, 40, 35, 30, 25, 20, 15, 10, 9, 8, 7, 6, 5, 4, 3, 2 or 1 degrees of the longitudinal direction 0108. With reference to FIG. 1, the primary second rail 0166 can be positioned between the primary second rounded void 0134 and the primary track void 0126 (e.g., primary T-shaped void). In some embodiments, the primary second rail 0166 forms a wall for both the primary second rounded void 0134 and the primary track void 0126 (e.g., primary T-shaped void). Optionally, the primary second rail 0166 extends in the longitudinal direction 0108 or within 45, 40, 35, 30, 25, 20, 15, 10, 9, 8, 7, 6, 5, 4, 3, 2 or 1 degrees of the longitudinal direction 0108.

With reference to FIG. 1, in some embodiments, the second wall 0142 comprises the secondary track 0130. In some embodiments, the secondary track 0130 comprises a secondary second rounded void 0138 (e.g., cylindrically shaped void). Optionally, the secondary track 0130 extends in the longitudinal direction 0108 or within 45, 40, 35, 30, 25, 20, 15, 10, 9, 8, 7, 6, 5, 4, 3, 2 or 1 degrees of the longitudinal direction 0108. The secondary track 0130 can be configured to slidably engage a secondary second rounded protrusion 0160 (e.g. cylindrically shaped protrusion). With reference to FIG. 1, in some embodiments, the secondary second rounded protrusion 0160 is configured to connect a seventh modular component 0162 to the connector 0100. The secondary second rounded void 0138 can be positioned at a proximal edge of the secondary track 0130 and the secondary first rounded void 0136 is positioned at a distal edge of the secondary track 0130. In some embodiments, the secondary track void 0128 is positioned between the secondary first rounded void 0136 and the secondary second rounded void 0138. Optionally, the secondary second rounded protrusion 0160 is proximal relative to the secondary track void 0128 (e.g., secondary T-shaped void).

In some embodiments of a connector, the secondary track 0130 comprises a secondary first rail 0168, a secondary second rail 0170, or a combination thereof. In some embodiments, the secondary first rail 0168 and the secondary second rail 0170 are configured to jointly slidably engage the secondary track protrusion 0144 (e.g., secondary T-shaped protrusion). In some embodiments, the secondary first rail 0168 is positioned between the secondary first rounded void 0136 and the secondary track void 0128 (e.g., secondary T-shaped void). In some embodiments, the secondary first rail 0168 forms a wall for both the secondary first rounded void 0136 and the secondary track void 0128 (e.g., secondary T-shaped void). Optionally, the secondary first rail 0168 extends in the longitudinal direction 0108 or within 45, 40, 35, 30, 25, 20, 15, 10, 9, 8, 7, 6, 5, 4, 3, 2 or 1 degrees of the longitudinal direction 0108. In some embodiments, the secondary second rail 0170 is positioned between the secondary second rounded void 0138 and the secondary track void 0128 (e.g., secondary T-shaped void). In some embodiments, the secondary second rail 0170 forms a wall for both the secondary second rounded void 0138 and the secondary track void 0128 (e.g., secondary T-shaped void). Optionally, the secondary second rail 0170 extends in the longitudinal direction 0108 or within 45, 40, 35, 30, 25, 20, 15, 10, 9, 8, 7, 6, 5, 4, 3, 2 or 1 degrees of the longitudinal direction 0108.

With reference to FIG. 1, in some embodiments, the patterned surface 0102 comprises a surface aperture pattern 0114 extending from the first wall 0140 to the second wall 0142 in a transverse direction 0110, 0610.

With reference to FIG. 1, in some embodiments, the first modular component 0120 is not: the second modular component 0124, the third modular component 0146, the fourth modular component 0150, the fifth modular component 0154, the sixth modular component 0158, the seventh modular component 0162 or a combination thereof. Nonetheless, in some embodiments, the first modular component 0120 ist: the second modular component 0124, the third modular component 0146, the fourth modular component 0150, the fifth modular component 0154, the sixth modular component 0158, the seventh modular component 0162 or a combination thereof.

With reference to FIG. 6, in some embodiments, the patterned surface 0602 comprises the primary track 0104. The patterned surface 0602 can also comprise a secondary track 0130.

With reference to FIG. 6, in some embodiments, the patterned surface 0602 comprises a surface aperture pattern 0614 extending between the first wall 0140 and the second wall 0142 in a transverse direction 0610, the patterned surface 0602 being connected to the first wall 0140 and the second wall 0142. In some embodiments, the patterned surface 0602 is connected to the first wall 0140 by the primary track 0104. Optionally, the patterned surface 0602 is connected to the second wall 0142 by the secondary track 0130.

In some embodiments, the surface aperture pattern 0614 of the patterned surface 0602 extends between the first wall 0140 and the second wall 0142 and abuts the primary track 0104. In some embodiments, the surface aperture pattern 0614 of the patterned surface 0602 extends between the first wall 0140 and the second wall 0142 and abuts the secondary track 0130. In some embodiments, the surface aperture pattern 0614 of the patterned surface 0602 extends between the primary track 0104 and the secondary track 0130.

With reference to FIG. 6, in some embodiments, the first wall 0140 comprises a first wall aperture pattern 0618. Optionally, the first wall aperture pattern 0618 extends from a proximal edge of the first wall 0140 to a distal edge of the first wall 0140.

Figure 8:
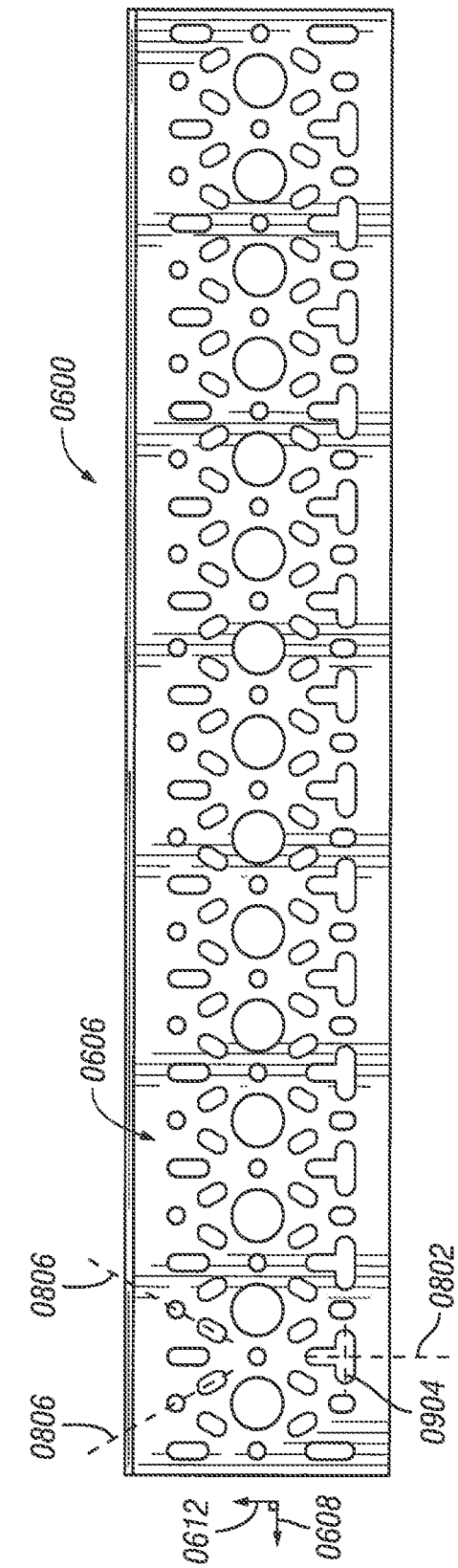
FIG. 8 is a right side view of the connector of FIG. 6, the left side view being a mirror image.

With reference to FIG. 8, in some embodiments of a connector, the first wall 0140 comprises apertures 0606 that are symmetrical across a normal aperture axis of symmetry 0802 that is parallel to the normal direction 0612. In some embodiments, the first wall 0140 comprises apertures that are symmetrical across a longitudinal aperture axis of symmetry 0904 parallel to the longitudinal direction 0608. In some embodiments, the first wall 0140 comprises apertures that are symmetrical across an oblique aperture axis of symmetry 0806 that is not parallel to the longitudinal direction 0608 or the normal direction 0612. In some embodiments, the first wall 0140 comprises circular apertures, circular apertures having a plurality of diameter sizes, a series of apertures of the same kind that are arranged in a pattern along the length of the first wall 0140, a pattern of apertures of different kinds that repeat along the length of the first wall 0140, apertures with edges that are rounded where the edges meet, apertures without corners, or a combination thereof.

In some embodiments of a connector, the first wall 0140 has a length that extends in the longitudinal direction 0608, a width that extends in the normal direction 0612, and a thickness that extends in the transverse direction 0610. Optionally, the length is greater than or equal to the width. Optionally, the width is greater than the thickness.

In some embodiments of a connector, the first wall aperture pattern 0618 is configured to receive at least one protruding element 0628, the protruding element 0628 can be configured to connect the connector 0600 to a sixth modular component 0630.

With reference to FIG. 6, in some embodiments, the first wall aperture pattern 0618 repeats (e.g., in the longitudinal direction 0608) to provide a plurality of first wall aperture patterns 0618. Optionally, each complete first wall aperture pattern 0618 in the plurality of first wall aperture patterns 0618 is identical within a tolerance of 10, 9, 8, 7, 6, 5, 4, 3, 2 or 1% by area, the tolerance being measured by (i) creating a superimposed image of any primary first wall aperture pattern 0618 in the plurality of first wall aperture patterns 0618 over any secondary first wall aperture pattern 0618 in the plurality of first wall aperture patterns 0618, (ii) identifying a first set of mismatched areas of the superimposed image where the primary first wall aperture pattern 0618 has a void area but the secondary first wall aperture pattern 0618 has a filled area, (iii) identifying a second set of mismatched areas of the superimposed image where the primary first wall aperture pattern 0618 has a filled area but the secondary first wall aperture pattern 0618 has a void area, (iv) summing the area of the first set of mismatched areas and the second set of mismatched areas to provide a sum, (v) dividing the sum by two to provide a quotient (v) dividing the quotient by the total area of the first wall aperture pattern 0618. Optionally, the longitudinal distance between each first wall aperture pattern 0618 in the plurality of first wall aperture patterns 0618 is identical. In some embodiments, the first wall aperture pattern is a primary first wall aperture pattern 0618 and apertures at the edge 0620 of the primary first wall aperture pattern 0618 can be completed, for example, as they would appear if a secondary first wall aperture pattern 0618 were placed adjacent to the primary first wall aperture pattern 0618 to continue the patterned surface, the first aperture pattern and the secondary first wall aperture pattern 0618 having the same orientation and differing only in displacement in the longitudinal direction. In some embodiments, each first wall aperture pattern 0618 in the plurality of first wall aperture patterns 0618 abuts an adjacent first wall aperture pattern 0618 in the plurality of surface aperture patterns.

With reference to FIG. 6, in some embodiments, the second wall 0142 comprises a second wall aperture pattern 0618. Optionally, the second wall aperture pattern 0618 extends from a proximal edge of the second wall 0142 to a distal edge of the second wall 0142.

With reference to FIG. 8, in some embodiments of a connector, the second wall 0142 comprises: apertures 0606 that are symmetrical across a normal aperture axis of symmetry 0802 parallel to the normal direction 0612; apertures 0606 that are symmetrical across a longitudinal aperture axis of symmetry 0904 parallel to the longitudinal direction 0608; apertures 0606 that are symmetrical across an oblique aperture axis of symmetry 0806 that is not parallel to the longitudinal direction 0608 or the normal direction 0612; circular apertures 0606; circular apertures 0606 having a plurality of diameter sizes; a series of apertures 0606 of the same kind that are arranged in a pattern along the length of the second wall 0142; a pattern of apertures 0606 of different kinds that repeat along the length of the second wall 0142; apertures 0606 with edges that are rounded where they meet; apertures 0606 without corners; or a combination thereof.

In some embodiments of a connector, the second wall 0142 has a length that extends in the longitudinal direction 0608, a width that extends in the normal direction 0612, and a thickness that extends in the transverse direction 0610. Optionally, the length is greater than or equal to the width. Optionally, the width is greater than the thickness.

In some embodiments of a connector, the second wall aperture pattern 0618 is configured to receive at least one protruding element 0632. Optionally, the protruding element 0632 configured to connect the connector 0600 to a seventh modular component 0634.

With reference to FIG. 6, in some embodiments, the second wall 0142 aperture pattern 0618 repeats (e.g., in the longitudinal direction 0608) to provide a plurality of second wall aperture patterns 0618. Optionally, each complete second wall aperture pattern 0618 in the plurality of second wall aperture patterns 0618 is identical within a tolerance of 10, 9, 8, 7, 6, 5, 4, 3, 2 or 1% by area, the tolerance being measured by (i) creating a superimposed image of any primary second wall aperture pattern 0618 in the plurality of second wall aperture patterns 0618 over any secondary second wall 0142 aperture pattern 0618 in the plurality of second wall aperture patterns 0618, (ii) identifying a first set of mismatched areas of the superimposed image where the primary second wall aperture pattern 0618 has a void area but the secondary second wall 0142 aperture pattern 0618 has a filled area, (iii) identifying a second set of mismatched areas of the superimposed image where the primary second wall aperture pattern 0618 has a filled area but the secondary second wall aperture pattern 0618 has a void area, (iv) summing the area of the first set of mismatched areas and the second set of mismatched areas to provide a sum, (v) dividing the sum by two to provide a quotient (v) dividing the quotient by the total area of the second wall aperture pattern 0618. In some embodiments, the longitudinal distance between each second wall aperture pattern 0618 in the plurality of second wall aperture patterns 0618 is identical. In some embodiments, the second wall aperture pattern is a primary second wall aperture pattern 0618 and apertures at the edge 0620 of the primary second wall aperture pattern 0618 can be completed, for example, as they would appear if a secondary second wall 0142 aperture pattern 0618 were placed adjacent to the primary second wall aperture pattern 0618 to continue the patterned surface, the first aperture pattern and the secondary second wall 0142 aperture pattern 0618 having the same orientation and differing only in displacement in the longitudinal direction. In some embodiments, each second wall 0142 aperture pattern 0618 in the plurality of second wall aperture patterns 0618 abuts an adjacent second wall 0142 aperture pattern 0618 in the plurality of surface aperture patterns.

With reference to FIG. 6, in some embodiments, the first wall aperture pattern 0618 and the second wall aperture pattern 0618 are mirror images within a tolerance of 10, 9, 8, 7, 6, 5, 4, 3, 2 or 1% by area (e.g., using a calculation method analogous to that explained above to determine whether individual patterns in the first wall 0140 are identical to within a specified degree of tolerance). Optionally, the surface aperture pattern 0614 differs from the first wall aperture pattern 0618, the second wall aperture pattern 0618, or a combination thereof.

With reference to FIG. 6, in some embodiments, the connector 0100, 0600 is made by extruding a material and perforating the material to provide the patterned surface 0602, the first wall aperture pattern 0618, the second wall aperture pattern 0618 or a combination thereof.

With reference again to FIG. 6, in some embodiments, the patterned surface 0602 of the connector comprises the primary track 0104. In some embodiments of a connector, the primary track 0104 directly or indirectly connects the first wall 0140 and a portion of the patterned surface 0602 comprising the surface aperture pattern 0614. Optionally, the portion of the patterned surface 0602 comprising the surface aperture pattern 0614 comprises a primary distal ledge 0172, the primary distal ledge 0172 serving as a portion of a wall for the primary track void 0126 (e.g., primary T-shaped void), With further reference to FIG. 6, in some embodiments of a connector, the primary first rounded void 0132 of the primary track 0104 is positioned at a distal edge of the primary track 0104. Optionally, the primary first rounded void 0132 of the primary track 0104 is positioned at a distal edge of the patterned surface 0602. In some embodiments, a proximal first wall ledge 0624 at proximal edge of the first wall 0140 forms a portion of the wall of the primary first rounded void 0132.

With reference to FIG. 6, in some embodiments, the primary track 0104 comprises a primary first rail 0164, a primary second rail 0166, or a combination thereof. The primary first rail 0164 and the primary second rail 0166 can be configured to jointly slidably engage the primary track protrusion 0122 (e.g., primary T-shaped protrusion). In some embodiments, the primary first rail 0164 is positioned between the primary first rounded void 0132 and the primary track void 0126 (e.g., primary T-shaped void). In some embodiments, the primary first rail 0164 forms a wall for both the primary first rounded void 0132 and the primary track void 0126 (e.g., primary T-shaped void). Optionally, the primary first rail 0164 extends in the longitudinal direction 0608 or within 45, 40, 35, 30, 25, 20, 15, 10, 9, 8, 7, 6, 5, 4, 3, 2 or 1 degrees of the longitudinal direction 0608. In some embodiments, the primary second rail 0166 is positioned between the primary track void 0126 (e.g., primary T-shaped void) and the portion of the patterned surface 0602 comprising the surface aperture pattern 0614. In some embodiments, the primary second rail 0166 is provided by a primary distal ledge 0172 of the portion of the patterned surface 0602 comprising the surface aperture pattern 0614. In some embodiments, the primary second rail 0166 forms a wall for both the primary track void 0126 (e.g., primary T-shaped void) and the portion of the patterned surface 0602 comprising the surface aperture pattern 0614. Optionally, the primary second rail 0166 extends in the longitudinal direction 0608 or within 45, 40, 35, 30, 25, 20, 15, 10, 9, 8, 7, 6, 5, 4, 3, 2 or 1 degrees of the longitudinal direction 0608.

With reference to FIG. 6, in some embodiments, the patterned surface 0602 comprises the secondary track 0130. In some embodiments, the secondary track 0130 directly or indirectly connects the second wall 0142 and a portion of the patterned surface 0602 comprising the surface aperture pattern 0614. Optionally, the portion of the patterned surface 0602 comprising the surface aperture pattern 0614 comprises a secondary distal ledge 0174, and the secondary distal ledge 0174 can serve as a portion of a wall for the secondary track void 0128 (e.g., secondary T-shaped void).

With reference again to FIG. 6, in some embodiments of a connector, the secondary first rounded void 0136 of the secondary track 0130 is positioned at a distal edge of the secondary track 0130. Optionally, the secondary first rounded void 0136 of the secondary track 0130 is positioned at a distal edge of the patterned surface 0602. In some embodiments, a proximal second wall ledge 0626 at a proximal edge of the second wall 0142 forms a portion of the wall of the secondary first rounded void 0136.

With reference to FIG. 6, in some embodiments, the secondary track 0130 comprises a secondary first rail 0168, a secondary second rail 0170, or a combination thereof. In some embodiments, the secondary first rail 0168 and the secondary second rail 0170 are configured to jointly slidably engage the secondary track protrusion 0144 (e.g., secondary T-shaped protrusion). In some embodiments, the secondary first rail 0168 is positioned between the secondary first rounded void 0136 and the secondary track void 0128 (e.g., secondary T-shaped void). In some embodiments, the secondary first rail 0168 forms a wall for both the secondary first rounded void 0136 and the secondary track void 0128 (e.g., secondary T-shaped void). Optionally, the secondary first rail 0168 extends in the longitudinal direction 0608 or within 45, 40, 35, 30, 25, 20, 15, 10, 9, 8, 7, 6, 5, 4, 3, 2 or 1 degrees of the longitudinal direction 0608. In some embodiments, the secondary second rail 0170 is positioned between the secondary track void 0128 (e.g., secondary T-shaped void) and the portion of the patterned surface 0602 comprising the surface aperture pattern 0614. In some embodiments, the secondary second rail 0170 is provided by a secondary distal ledge 0174 of the portion of the patterned surface 0602 comprising the surface aperture pattern 0614. In some embodiments, the secondary second rail 0170 forms a wall for both the secondary track void 0128 (e.g., secondary T-shaped void) and the portion of the patterned surface 0602 comprising the surface aperture pattern 0614. Optionally, the secondary second rail 0170 extends in the longitudinal direction 0608 or within 45, 40, 35, 30, 25, 20, 15, 10, 9, 8, 7, 6, 5, 4, 3, 2 or 1 degrees of the longitudinal direction 0608.

With reference to FIG. 6, in some embodiments, the first modular component 0120 is not: the second modular component 0124, the third modular component 0146, the fourth modular component 0150, the fifth modular component 054, the sixth modular component 0630, the seventh modular component 0634 or a combination thereof. Nonetheless, in some embodiments the first modular component 0120 is: the second modular component 0124, the third modular component 0146, the fourth modular component 0150, the fifth modular component 0154, the sixth modular component 630, the seventh modular component 0634 or a combination thereof.

As a skilled person would understand any suitable material and size can be used for the connector, a component of the connector, a subcomponent of the component of the connector, a system comprising the connector, a component of the system comprising the connector, or a subcomponent of the component of the system comprising the connector. In some embodiments, suitable materials include metals, metal alloys, and polymers. In some embodiments, the connector can comprise or consist of a polymer, rubber, plastic, or thermoplastic. As another example, the connector can comprise a polymer compatible with forming the connector via extrusion. In some embodiments, the connector is made of a hard, durable metal or polymer that does not significantly bend and does not fracture under the forces expected to be applied to the connector in operation so as to maintain a connection with one or more components attached the connector.

In some embodiments, the connector has a maximum length equal to 5.5 inches+/−50%, 40%, 30%, 25%, 20%, 15%, 10%, 5%, 4%, 3%, 2%, or 1%. As used in this context, the length is the longest distance between two points in the longitudinal direction. In some embodiments, a connector has a maximum width equal to 1.5 inches+/−50%, 40%, 30%, 25%, 20%, 15%, 10%, 5%, 4%, 3%, 2%, or 1%. As used in this context, the width is the longest distance between two points in the transverse direction. In some embodiments, a connector has a maximum height equal to 0.5 inches+/−50%, 40%, 30%, 25%, 20%, 15%, 10%, 5%, 4%, 3%, 2%, or 1%. As used in this context, the width is the longest distance between two points in the normal direction.

Additional Embodiments

The following clauses include descriptive embodiments that are offered as further disclosure of embodiments of connectors and associated systems. Although drawing reference numbers are included in this Additional Embodiments section, these drawing reference numbers provide examples of the elements recited in this section, but do not limit the features illustrated by the drawing reference numbers.

1. A connector 0100, 0600 comprising:

a patterned surface 0102, 0602 and a primary track 0104 connected to the patterned surface 0102, 0602;

the patterned surface 0102, 0602 comprising a surface aperture pattern 0114, 0614, the surface aperture pattern 0114, 0614 configured to receive at least one protruding element 0118, the protruding element 0118 configured to connect the connector 0100, 0600 to a first modular component 0120.

2. The connector of clause 1 including at least one feature selected from the following group of features:

optionally the connector 0100, 0600 is made by extruding a material and perforating the material to provide the patterned surface 0102, 0602, optionally the connector 0100, 0600 is made from a polymer (e.g., thermoplastic polymer), optionally the connector 0100, 0600 is integral so that the connector 0100, 0600 consists of a single piece;

optionally, the patterned surface 0102, 0602 comprises apertures 0106, 0606 that are symmetrical across a transverse aperture axis of symmetry 0402, 0902 parallel to the transverse direction 0110, 0610, apertures 0106, 0606 that are symmetrical across a longitudinal aperture axis of symmetry 0404, 0904 parallel to the longitudinal direction 0108, 0608, apertures 0106, 0606 that are symmetrical across an oblique aperture axis of symmetry 0406, 0906 that is not parallel to the longitudinal direction 0108, 0608 or the transverse direction 0110, 0610, circular apertures 0106, 0606, circular apertures 0106, 0606 having a plurality of diameter sizes, a series of apertures 0106, 0606 of the same kind that are arranged in a pattern along the length of the patterned surface 0102, 0602, a pattern of apertures 0106, 0606 of different kinds that repeat along the length of the patterned surface 0102, 0602, apertures 0106, 0606 with edges that are rounded where the edges meet, apertures 0106, 0606 without corners, or a combination thereof;

optionally, the patterned surface 0102, 0602 has a length that extends in a longitudinal direction 0108, 0608 (e.g., direction of extrusion of the connector, or a quasi-extrusion-direction similar to a direction of extrusion of the connector along which quasi-extrusion-direction the connector has a constant or essentially constant cross-section, for example, the latter can be a useful description for a molded device that is not actually extruded but could have been formed by extrusion of the body of the connector and perforation of the body to form the apertures in the body), a width that extends in a transverse direction 0110, 0610, and a thickness that extends in a normal direction 0112, 0612, the transverse direction 0110, 0610 being perpendicular to the longitudinal direction 0108, 0608, the normal direction 0112, 0612 being perpendicular to the longitudinal direction 0108, 0608 and the transverse direction 0110, 0610, optionally the length being greater than or equal to the width, optionally the width being greater than the thickness;

optionally the surface aperture pattern 0114, 0614 of the patterned surface 0102, 0602 repeats (e.g., in the longitudinal direction 0108, 0608) to provide a plurality of surface aperture patterns 0114, 0614, optionally each complete surface aperture pattern 0114, 0614 in the plurality of surface aperture patterns 0114, 0614 is identical within a tolerance of 10, 9, 8, 7, 6, 5, 4, 3, 2 or 1% by area, the tolerance being measured by (i) creating a superimposed image of any secondary surface aperture pattern 0114, 0614 in the plurality of surface aperture patterns 0114, 0614 over any primary surface aperture pattern 0114, 0614 in the plurality of surface aperture patterns 0114, 0614, (ii) identifying a first set of mismatched areas of the superimposed image where the primary surface aperture pattern 0114, 0614 has a void area but the secondary surface aperture pattern 0114, 0614 has a filled area, (iii) identifying a second set of mismatched areas of the superimposed image where the primary surface aperture pattern 0114, 0614 has a filled area but the secondary surface aperture pattern 0114, 0614 has a void area, (iv) summing the area of the first set of mismatched areas and the second set of mismatched areas to provide a sum, (v) dividing the sum by two to provide a quotient (v) dividing the quotient by the total area of the surface aperture pattern 0114, 0614, optionally the longitudinal distance between each surface aperture pattern 0114, 0614 in the plurality of surface aperture patterns 0114, 0614 is identical; optionally the surface aperture pattern is a primary surface aperture pattern and apertures at the edge 0116, 0616 of the primary surface aperture pattern can be completed, for example, as they would appear if a secondary surface aperture pattern were placed adjacent to the primary surface aperture pattern to continue the patterned surface, the primary surface aperture pattern and the secondary surface aperture pattern having the same orientation and differing only in displacement in the longitudinal direction; optionally each surface aperture pattern 0114, 0614 in the plurality of surface aperture patterns 0114, 0614 abuts an adjacent surface aperture pattern 0114, 0614 in the plurality of surface aperture patterns;

optionally a protruding element in the at least one protruding element 0118 is configured to rotatably connect the connector 0100, 0600 to the first modular component 0120, optionally the at least one protruding element 0118 is configured to slidably connect the connector 0100, 0600 to the first modular component 0120, optionally a protruding element in the at least one protruding element 0118 and the first modular component 0120 being able to slide at least partly in the transverse direction 0110, 0610, at least partly in the longitudinal direction 0108, 0608, at least partly in the normal direction 0112, 0612, or a combination thereof, optionally the at least one protruding element 0118 is configured to immobilize the connector 0100, 0600 relative to a point on the first modular component 0120;

optionally the primary track 0104 is configured to slidably engage a primary track protrusion 0122, the primary track protrusion 0122 configured to connect a second modular component 0124 to the connector 0100, 0600, optionally the primary track 0104 comprising a primary track void 0126 (e.g., primary T-shaped void), the primary track void 0126 configured to slidably engage the primary track protrusion 0122;

optionally the primary track 0104 comprises a primary track void 0126 (e.g., primary T-shaped void, optionally extending in the longitudinal direction 0108, 0608 or within 45, 40, 35, 30, 25, 20, 15, 10, 9, 8, 7, 6, 5, 4, 3, 2 or 1 degrees of the longitudinal direction 0108, 0608) that is configured to slidably engage a primary track protrusion 0122 (e.g., primary T-shaped protrusion), the primary track protrusion 0122 (e.g., the primary T-shaped protrusion) configured to connect a second modular component 0124 to the connector 0100, 0600;

optionally the primary track 0104 comprises a primary first rounded void 0132 (e.g., cylindrically shaped void), optionally extending in the longitudinal direction 0108, 0608 or within 45, 40, 35, 30, 25, 20, 15, 10, 9, 8, 7, 6, 5, 4, 3, 2 or 1 degrees of the longitudinal direction 0108, 0608, that is configured to slidably engage a primary first rounded protrusion 0148 (e.g. cylindrically shaped protrusion), optionally the primary first rounded protrusion 0148 configured to connect a fourth modular component 0150 to the connector 0100, 0600, optionally the primary first rounded void 0132 is distal relative to the primary track void 0126;

optionally the connector 0100, 0600 comprises a secondary track 0130;

optionally the secondary track 0130 is configured to slidably engage a secondary track protrusion 0144, the secondary track protrusion 0144 configured to connect a third modular component 0146 to the connector 0100, 0600, optionally the secondary track 0130 comprising a secondary track void 0128, the secondary track void 0128 configured to slidably engage the secondary track protrusion 0144;

optionally the secondary track 0130 comprises a secondary track void 0128 (e.g., secondary T-shaped void) (optionally extending in the longitudinal direction 0108, 0608 or within 45, 40, 35, 30, 25, 20, 15, 10, 9, 8, 7, 6, 5, 4, 3, 2 or 1 degrees of the longitudinal direction 0108, 0608) that is configured to slidably engage a secondary track protrusion 0144 (e.g., secondary T-shaped protrusion), the secondary track protrusion 0144 (e.g., secondary T-shaped protrusion) configured to connect a third modular component 0146 to the connector 0100, 0600;

optionally the secondary track 0130 comprises a secondary first rounded void 0136 (e.g., cylindrically shaped void), optionally extending in the longitudinal direction 0108, 0608 or within 45, 40, 35, 30, 25, 20, 15, 10, 9, 8, 7, 6, 5, 4, 3, 2 or 1 degrees of the longitudinal direction 0108, 0608, that is configured to slidably engage a secondary first rounded protrusion 0152 (e.g. cylindrically shaped protrusion), optionally the secondary first rounded protrusion 0152 configured to connect a fifth modular component 0154 to the connector 0100, 0600, optionally the secondary first rounded void 0136 is distal relative to the secondary track void 0128;

optionally the connector 0100, 0600 comprises a first wall 0140 fixed to the patterned surface 0102, 0602 and extending at least partly in the normal direction 0112, 0612, optionally the first wall 0140 extends in a direction within 45, 40, 35, 30, 25, 20, 15, 10, 9, 8, 7, 6, 5, 4, 3, 2 or 1 degrees of the normal direction 0112, 0612, optionally the first wall 0140 is connected to the patterned surface 0102, 0602 at a first edge of the patterned surface 0102, 0602;

optionally the first wall 0140 comprises a planar portion, optionally the planar portion of the first wall 0140 extends in a direction within 45, 40, 35, 30, 25, 20, 15, 10, 9, 8, 7, 6, 5, 4, 3, 2 or 1 degrees of the normal direction 0112, 0612, optionally the planar portion of the first wall 0140 is connected to the patterned surface 0102, 0602 at a first edge of the patterned surface 0102, 0602;

optionally the connector 0100, 0600 comprises a second wall 0142 fixed to the patterned surface 0102, 0602 and extending at least partly in the normal direction 0112, 0612, optionally the second wall 0142 extends in a direction within 45, 40, 35, 30, 25, 20, 15, 10, 9, 8, 7, 6, 5, 4, 3, 2 or 1 degrees of the normal direction 0112, 0612, optionally the second wall 0142 is connected to the patterned surface 0102, 0602 at a second edge of the patterned surface 0102, 0602, optionally the second edge of the patterned surface 0102, 0602 is opposite the first edge of the patterned surface 0102, 0602, optionally the first edge of the patterned surface 0102, 0602 and the second edge of the patterned surface 0102, 0602 are positioned across the width of the patterned surface 0102, 0602, optionally the second wall 0142 is within 45, 40, 35, 30, 25, 20, 15, 10, 9, 8, 7, 6, 5, 4, 3, 2 or 1 degrees of the normal direction 0112, 0612;

optionally the second wall 0142 comprises a planar portion, optionally the planar portion of the second wall 0142 extends in a direction within 45, 40, 35, 30, 25, 20, 15, 10, 9, 8, 7, 6, 5, 4, 3, 2 or 1 degrees of the normal direction 0112, 0612, optionally the planar portion of the second wall 0142 is connected to the patterned surface 0102, 0602 at a second edge of the patterned surface 0102, 0602, optionally the second edge of the patterned surface 0102, 0602 is opposite the first edge of the patterned surface 0102, 0602, optionally the first edge of the patterned surface 0102, 0602 and the second edge of the patterned surface 0102, 0602 are positioned across the width of the patterned surface 0102, 0602, optionally the planar portion of the second wall 0142 is within 45, 40, 35, 30, 25, 20, 15, 10, 9, 8, 7, 6, 5, 4, 3, 2 or 1 degrees of the normal direction 0112, 0612;

optionally the connector 0100, 0600 forms a channel comprising the patterned surface 0102, 0602, the first wall 0140 and the second wall 0142;

optionally the first modular component 0120 is: the second modular component 0124, the third modular component 0146, the fourth modular component 0150, the fifth modular component 0154 or a combination thereof;

optionally the first modular component 0120 is not: the second modular component 0124, the third modular component 0146, the fourth modular component 0150, the fifth modular component 0154 or a combination thereof;

any other feature of a connector described in this application; or any combination thereof.

3. The connector of clause 1 or clause 2, the connector including at least one feature selected from the following group of features:

optionally the first wall 0140 comprises the primary track 0104;

optionally the primary track 0104 comprises a primary second rounded void 0134 (e.g., cylindrically shaped void), optionally extending in the longitudinal direction 0108 or within 45, 40, 35, 30, 25, 20, 15, 10, 9, 8, 7, 6, 5, 4, 3, 2 or 1 degrees of the longitudinal direction 0108, that is configured to slidably engage a primary second rounded protrusion 0156 (e.g. cylindrically shaped protrusion), the primary second rounded protrusion 0156 configured to connect a sixth modular component 0158 to the connector 0100, optionally the primary second rounded void 0134 is positioned at a proximal edge of the primary track 0104 and the primary first rounded void 0132 is positioned at a distal edge of the primary track 0104, optionally the primary track void 0126 being positioned between the primary first rounded void 0132 and the primary second rounded void 0134, optionally the primary second rounded protrusion 0156 is proximal relative to the primary track void 0126 (e.g., primary T-shaped void);

optionally the primary track 0104 comprises a primary first rail 0164, optionally the primary track 0104 comprises a primary second rail 0166, optionally the primary first rail 0164 and the primary second rail 0166 are configured to jointly slidably engage the primary track protrusion 0122 (e.g., primary T-shaped protrusion); optionally the primary first rail 0164 is positioned between the primary first rounded void 0132 and the primary track void 0126 (e.g., primary T-shaped void), optionally the primary first rail 0164 forms a wall for both the primary first rounded void 0132 and the primary track void 0126 (e.g., primary T-shaped void), optionally the primary first rail 0164 extends in the longitudinal direction 0108 or within 45, 40, 35, 30, 25, 20, 15, 10, 9, 8, 7, 6, 5, 4, 3, 2 or 1 degrees of the longitudinal direction 0108, optionally the primary second rail 0166 is positioned between the primary second rounded void 0134 and the primary track void 0126 (e.g., primary T-shaped void), optionally the primary second rail 0166 forms a wall for both the primary second rounded void 0134 and the primary track void 0126 (e.g., primary T-shaped void), optionally the primary second rail 0166 extends in the longitudinal direction 0108 or within 45, 40, 35, 30, 25, 20, 15, 10, 9, 8, 7, 6, 5, 4, 3, 2 or 1 degrees of the longitudinal direction 0108;

optionally the second wall 0142 comprises the secondary track 0130;

optionally the secondary track 0130 comprises a secondary second rounded void 0138 (e.g., cylindrically shaped void), optionally extending in the longitudinal direction 0108 or within 45, 40, 35, 30, 25, 20, 15, 10, 9, 8, 7, 6, 5, 4, 3, 2 or 1 degrees of the longitudinal direction 0108, that is configured to slidably engage a secondary second rounded protrusion 0160 (e.g. cylindrically shaped protrusion), the secondary second rounded protrusion 0160 configured to connect a seventh modular component 0162 to the connector 0100, optionally the secondary second rounded void 0138 is positioned at a proximal edge of the secondary track 0130 and the secondary first rounded void 0136 is positioned at a distal edge of the secondary track 0130, optionally the secondary track void 0128 being positioned between the secondary first rounded void 0136 and the secondary second rounded void 0138, optionally the secondary second rounded protrusion 0160 is proximal relative to the secondary track void 0128 (e.g., secondary T-shaped void);

optionally the secondary track 0130 comprises a secondary first rail 0168, optionally the secondary track 0130 comprises a secondary second rail 0170, optionally the secondary first rail 0168 and the secondary second rail 0170 are configured to jointly slidably engage the secondary track protrusion 0144 (e.g., secondary T-shaped protrusion); optionally the secondary first rail 0168 is positioned between the secondary first rounded void 0136 and the secondary track void 0128 (e.g., secondary T-shaped void), optionally the secondary first rail 0168 forms a wall for both the secondary first rounded void 0136 and the secondary track void 0128 (e.g., secondary T-shaped void), optionally the secondary first rail 0168 extends in the longitudinal direction 0108 or within 45, 40, 35, 30, 25, 20, 15, 10, 9, 8, 7, 6, 5, 4, 3, 2 or 1 degrees of the longitudinal direction 0108, optionally the secondary second rail 0170 is positioned between the secondary second rounded void 0138 and the secondary track void 0128 (e.g., secondary T-shaped void), optionally the secondary second rail 0170 forms a wall for both the secondary second rounded void 0138 and the secondary track void 0128 (e.g., secondary T-shaped void), optionally the secondary second rail 0170 extends in the longitudinal direction 0108 or within 45, 40, 35, 30, 25, 20, 15, 10, 9, 8, 7, 6, 5, 4, 3, 2 or 1 degrees of the longitudinal direction 0108;

optionally the patterned surface 0102 comprising a surface aperture pattern 0114 extending from the first wall 0140 to the second wall 0142 in a transverse direction 0110, 0610, optionally the first modular component 0120 is: the second modular component 0124, the third modular component 0146, the fourth modular component 0150, the fifth modular component 0154, the sixth modular component 0158, the seventh modular component 0162 or a combination thereof;

optionally the first modular component 0120 is not: the second modular component 0124, the third modular component 0146, the fourth modular component 0150, the fifth modular component 0154, the sixth modular component 0158, the seventh modular component 0162 or a combination thereof;

any other feature of a connector described in this application; or any combination thereof.

4. The connector of clause 1 or clause 2, the connector including at least one feature selected from the following group of features:

optionally the patterned surface 0602 comprises a primary track 0104;

optionally the patterned surface 0602 comprises a secondary track 0130;

optionally the patterned surface 0602 comprises a surface aperture pattern 0614 extending between the first wall 0140 and the second wall 0142 in a transverse direction 0610, the patterned surface 0602 being connected to the first wall 0140 and the second wall 0142, optionally the patterned surface 0602 is connected to the first wall 0140 by the primary track 0104, optionally the patterned surface 0602 is connected to the second wall 0142 by the secondary track 0130;

optionally the surface aperture pattern 0614 of the patterned surface 0602 extends between the first wall 0140 and the second wall 0142 and abuts the primary track 0104; optionally the surface aperture pattern 0614 of the patterned surface 0602 extends between the first wall 0140 and the second wall 0142 and abuts the secondary track 0130; optionally the surface aperture pattern 0614 of the patterned surface 0602 extends between the primary track 0104 and the secondary track 0130;

optionally the first wall 0140 comprises a first wall aperture pattern 0618, optionally the first wall aperture pattern 0618 extends from a proximal edge of the first wall 0140 to a distal edge of the first wall 0140;

optionally, the first wall 0140 comprises apertures 0606 that are symmetrical across a normal aperture axis of symmetry 0802 parallel to the normal direction 0612, apertures 0606 that are symmetrical across a longitudinal aperture axis of symmetry 0904 parallel to the longitudinal direction 0608, apertures 0606 that are symmetrical across an oblique aperture axis of symmetry 0806 that is not parallel to the longitudinal direction 0608 or the normal direction 0612, circular apertures 0606, circular apertures 0606 having a plurality of diameter sizes, a series of apertures 0606 of the same kind that are arranged in a pattern along the length of the first wall 0140, a pattern of apertures 0606 of different kinds that repeat along the length of the first wall 0140, apertures 0606 with edges that are rounded where the edges meet, apertures 0606 without corners, or a combination thereof;

optionally, the first wall 0140 has a length that extends in the longitudinal direction 0608, a width that extends in the normal direction 0612, and a thickness that extends in the transverse direction 0610, optionally the length being greater than or equal to the width, optionally the width being greater than the thickness;

optionally the first wall aperture pattern 0618 configured to receive at least one protruding element 0628, the protruding element 0628 configured to connect the connector 0600 to a sixth modular component 0630;

optionally the first wall aperture pattern 0618 repeats (e.g., in the longitudinal direction 0608) to provide a plurality of first wall aperture patterns 0618, optionally each complete first wall aperture pattern 0618 in the plurality of first wall aperture patterns 0618 is identical within a tolerance of 10, 9, 8, 7, 6, 5, 4, 3, 2 or 1% by area, the tolerance being measured by (i) creating a superimposed image of any primary first wall aperture pattern 0618 in the plurality of first wall aperture patterns 0618 over any secondary first wall aperture pattern 0618 in the plurality of first wall aperture patterns 0618, (ii) identifying a first set of mismatched areas of the superimposed image where the primary first wall aperture pattern 0618 has a void area but the secondary first wall aperture pattern 0618 has a filled area, (iii) identifying a second set of mismatched areas of the superimposed image where the primary first wall aperture pattern 0618 has a filled area but the secondary first wall aperture pattern 0618 has a void area, (iv) summing the area of the first set of mismatched areas and the second set of mismatched areas to provide a sum, (v) dividing the sum by two to provide a quotient (v) dividing the quotient by the total area of the first wall aperture pattern 0618, optionally the longitudinal distance between each first wall aperture pattern 0618 in the plurality of first wall aperture patterns 0618 is identical; optionally the first wall aperture pattern is a primary first wall aperture pattern 0618 and apertures at the edge 0620 of the primary first wall aperture pattern 0618 can be completed, for example, as they would appear if a secondary first wall aperture pattern 0618 were placed adjacent to the primary first wall aperture pattern 0618 to continue the patterned surface, the first aperture pattern and the secondary first wall aperture pattern 0618 having the same orientation and differing only in displacement in the longitudinal direction; optionally each first wall aperture pattern 0618 in the plurality of first wall aperture patterns 0618 abuts an adjacent first wall aperture pattern 0618 in the plurality of surface aperture patterns;

optionally the second wall 0142 comprises a second wall aperture pattern 0618, optionally the second wall aperture pattern 0618 extends from a proximal edge of the second wall 0142 to a distal edge of the second wall 0142;

optionally, the second wall 0142 comprises apertures 0606 that are symmetrical across a normal aperture axis of symmetry 0802 parallel to the normal direction 0612, apertures 0606 that are symmetrical across a longitudinal aperture axis of symmetry 0904 parallel to the longitudinal direction 0608, apertures 0606 that are symmetrical across an oblique aperture axis of symmetry 0806 that is not parallel to the longitudinal direction 0608 or the normal direction 0612, circular apertures 0606, circular apertures 0606 having a plurality of diameter sizes, a series of apertures 0606 of the same kind that are arranged in a pattern along the length of the second wall 0142, a pattern of apertures 0606 of different kinds that repeat along the length of the second wall 0142, apertures 0606 with edges that are rounded where they meet, apertures 0606 without corners, or a combination thereof;

optionally, the second wall 0142 has a length that extends in the longitudinal direction 0608, a width that extends in the normal direction 0612, and a thickness that extends in the transverse direction 0610, optionally the length being greater than or equal to the width, optionally the width being greater than the thickness;

optionally the second wall aperture pattern 0618 configured to receive at least one protruding element 0632, the protruding element 0632 configured to connect the connector 0600 to a seventh modular component 0634;

optionally the second wall 0142 aperture pattern 0618 repeats (e.g., in the longitudinal direction 0608) to provide a plurality of second wall aperture patterns 0618, optionally each complete second wall 0142 aperture pattern 0618 in the plurality of second wall aperture patterns 0618 is identical within a tolerance of 10, 9, 8, 7, 6, 5, 4, 3, 2 or 1% by area, the tolerance being measured by (i) creating a superimposed image of any primary second wall aperture pattern 0618 in the plurality of second wall aperture patterns 0618 over any secondary second wall 0142 aperture pattern 0618 in the plurality of second wall aperture patterns 0618, (ii) identifying a first set of mismatched areas of the superimposed image where the primary second wall aperture pattern 0618 has a void area but the secondary second wall 0142 aperture pattern 0618 has a filled area, (iii) identifying a second set of mismatched areas of the superimposed image where the primary second wall aperture pattern 0618 has a filled area but the secondary second wall 0142 aperture pattern 0618 has a void area, (iv) summing the area of the first set of mismatched areas and the second set of mismatched areas to provide a sum, (v) dividing the sum by two to provide a quotient (v) dividing the quotient by the total area of the second wall 0142 aperture pattern 0618, optionally the longitudinal distance between each second wall 0142 aperture pattern 0618 in the plurality of second wall aperture patterns 0618 is identical; optionally the second wall aperture pattern is a primary second wall aperture pattern 0618 and apertures at the edge 0620 of the primary second wall aperture pattern 0618 can be completed, for example, as they would appear if a secondary second wall 0142 aperture pattern 0618 were placed adjacent to the primary second wall aperture pattern 0618 to continue the patterned surface, the first aperture pattern and the secondary second wall 0142 aperture pattern 0618 having the same orientation and differing only in displacement in the longitudinal direction; optionally each second wall 0142 aperture pattern 0618 in the plurality of second wall aperture patterns 0618 abuts an adjacent second wall 0142 aperture pattern 0618 in the plurality of surface aperture patterns;

optionally the first wall aperture pattern 0618 and the second wall aperture pattern 0618 are mirror images within a tolerance of 10, 9, 8, 7, 6, 5, 4, 3, 2 or 1% by area (e.g., using a calculation method analogous to that explained above to determine whether individual patterns in the first wall 0140 are identical to within a specified degree of tolerance), optionally the surface aperture pattern 0614 differs from the first wall aperture pattern 0618, the second wall aperture pattern 0618, or a combination thereof;

optionally the connector 0100, 0600 is made by extruding a material and perforating the material to provide the patterned surface 0602, the first wall aperture pattern 0618, the second wall aperture pattern 0618 or a combination thereof;

optionally the patterned surface 0602 comprises the primary track 0104;

optionally the primary track 0104 directly or indirectly connects the first wall 0140 and a portion of the patterned surface 0602 comprising the surface aperture pattern 0614, optionally the portion of the patterned surface 0602 comprising the surface aperture pattern 0614 comprises a primary distal ledge 0172, the primary distal ledge 0172 serving as a portion of a wall for the primary track void 0126 (e.g., primary T-shaped void), optionally the primary first rounded void 0132 of the primary track 0104 is positioned at a distal edge of the primary track 0104, optionally the primary first rounded void 0132 of the primary track 0104 is positioned at a distal edge of the patterned surface 0602, optionally a proximal first wall ledge 0624 at proximal edge of the first wall 0140 forms a portion of the wall of the primary first rounded void 0132;

optionally the primary track 0104 comprises a primary first rail 0164, optionally the primary track 0104 comprises a primary second rail 0166, optionally the primary first rail 0164 and the primary second rail 0166 are configured to jointly slidably engage the primary track protrusion 0122 (e.g., primary T-shaped protrusion), optionally the primary first rail 0164 is positioned between the primary first rounded void 0132 and the primary track void 0126 (e.g., primary T-shaped void), optionally the primary first rail 0164 forms a wall for both the primary first rounded void 0132 and the primary track void 0126 (e.g., primary T-shaped void), optionally the primary first rail 0164 extends in the longitudinal direction 0608 or within 45, 40, 35, 30, 25, 20, 15, 10, 9, 8, 7, 6, 5, 4, 3, 2 or 1 degrees of the longitudinal direction 0608, optionally the primary second rail 0166 is positioned between the primary track void 0126 (e.g., primary T-shaped void) and the portion of the patterned surface 0602 comprising the surface aperture pattern 0614, optionally the primary second rail 0166 is provided by a primary distal ledge 0172 of the portion of the patterned surface 0602 comprising the surface aperture pattern 0614, optionally the primary second rail 0166 forms a wall for both the primary track void 0126 (e.g., primary T-shaped void) and the portion of the patterned surface 0602 comprising the surface aperture pattern 0614, optionally the primary second rail 0166 extends in the longitudinal direction 0608 or within 45, 40, 35, 30, 25, 20, 15, 10, 9, 8, 7, 6, 5, 4, 3, 2 or 1 degrees of the longitudinal direction 0608;

optionally the patterned surface 0602 comprises the secondary track 0130;

optionally the secondary track 0130 directly or indirectly connects the second wall 0142 and a portion of the patterned surface 0602 comprising the surface aperture pattern 0614, optionally the portion of the patterned surface 0602 comprising the surface aperture pattern 0614 comprises a secondary distal ledge 0174, the secondary distal ledge 0174 serving as a portion of a wall for the secondary track void 0128 (e.g., secondary T-shaped void);

optionally the secondary first rounded void 0136 of the secondary track 0130 is positioned at a distal edge of the secondary track 0130, optionally the secondary first rounded void 0136 of the secondary track 0130 is positioned at a distal edge of the patterned surface 0602, optionally a proximal second wall ledge 0626 at a proximal edge of the second wall 0142 forms a portion of the wall of the secondary first rounded void 0136;

optionally the secondary track 0130 comprises a secondary first rail 0168, optionally the secondary track 0130 comprises a secondary second rail 0170, optionally the secondary first rail 0168 and the secondary second rail 0170 are configured to jointly slidably engage the secondary track protrusion 0144 (e.g., secondary T-shaped protrusion); optionally the secondary first rail 0168 is positioned between the secondary first rounded void 0136 and the secondary track void 0128 (e.g., secondary T-shaped void), optionally the secondary first rail 0168 forms a wall for both the secondary first rounded void 0136 and the secondary track void 0128 (e.g., secondary T-shaped void), optionally the secondary first rail 0168 extends in the longitudinal direction 0608 or within 45, 40, 35, 30, 25, 20, 15, 10, 9, 8, 7, 6, 5, 4, 3, 2 or 1 degrees of the longitudinal direction 0608, optionally the secondary second rail 0170 is positioned between the secondary track void 0128 (e.g., secondary T-shaped void) and the portion of the patterned surface 0602 comprising the surface aperture pattern 0614, optionally the secondary second rail 0170 is provided by a secondary distal ledge 0174 of the portion of the patterned surface 0602 comprising the surface aperture pattern 0614, optionally the secondary second rail 0170 forms a wall for both the secondary track void 0128 (e.g., secondary T-shaped void) and the portion of the patterned surface 0602 comprising the surface aperture pattern 0614, optionally the secondary second rail 0170 extends in the longitudinal direction 0608 or within 45, 40, 35, 30, 25, 20, 15, 10, 9, 8, 7, 6, 5, 4, 3, 2 or 1 degrees of the longitudinal direction 0608;

optionally the first modular component 0120 is: the second modular component 0124, the third modular component 0146, the fourth modular component 0150, the fifth modular component 054, the sixth modular component 0630, the seventh modular component 0634 or a combination thereof;

optionally the first modular component 0120 is not: the second modular component 0124, the third modular component 0146, the fourth modular component 0150, the fifth modular component 0154, the sixth modular component 630, the seventh modular component 0634 or a combination thereof;

any other feature of a connector described in this application; or any combination thereof.

5. A system comprising the connector of any one of claims 1 to 4, and another feature selected from the following group of features:

an additional connector according to any one of claims 1 to 4;

protruding element 0118 configured to connect the connector 0100, 0600 to a first modular component 0120;

to a first modular component 0120;

primary track protrusion 0122 configured to connect a second modular component 0124 to the connector 0100, 0600;

a second modular component 0124;

the secondary track protrusion 0144 (e.g., secondary T-shaped protrusion) configured to connect a third modular component 0146 to the connector 0100, 0600;

a third modular component 0146;

primary first rounded protrusion 0148 configured to connect a fourth modular component 0150 to the connector 0100, 0600;

a fourth modular component 0150;

secondary first rounded protrusion 0152 configured to connect a fifth modular component 0154 to the connector 0100, 0600;

a fifth modular component 0154;

primary second rounded protrusion 0156 configured to connect a sixth modular component 0158 to the connector 0100;

a sixth modular component 0158;

secondary second rounded protrusion 0160 configured to connect a seventh modular component 0162 to the connector 0100;

a seventh modular component 0162;

at least one protruding element 0628, the protruding element 0628 configured to connect the connector 0600 to a sixth modular component 0630;

a sixth modular component 0630;

at least one protruding element 0632, the protruding element 0632 configured to connect the connector 0600 to a seventh modular component 0634;

a seventh modular component 0634;

any other feature described in this application; or any combination thereof.

Although the invention has been described above and in the drawings using a connector that is generally the shape of a C-shaped channel or a U-shaped channel, the connector is not limited to these shapes. For example, the second wall can be omitted. Alternatively, an additional wall that is somewhat transverse to the first or the second wall can be added. Corners or straight edges in the connector can be rounded, and vice versa.

Although embodiments of the invention have been described using the word "comprising," additional embodiments can be created by replacing the word "comprising" with "consisting essentially of" or "consisting of."

Although embodiments of the invention have been described using the word "is" or "are" or similar words, additional embodiments can be created by replacing the word "is" or "are" or similar words with "comprises" with "consists essentially of" or "consists of."

Although embodiments of the invention have been described using a first range with a first set of end points, additional embodiments can be created by replacing the first range with a narrower range whose endpoints are selected from any value contained in the first range.

Although embodiment of the invention have been described using a specific direction relative to a reference direction, additional embodiments can be created by indicating that specific direction can vary from the reference direction by no more than 45, 40, 35, 30, 25, 20, 15, 10, 9, 8, 7, 6, 5, 4, 3, 2 or 1 degrees.

Although embodiment of the invention have been described using a specific orientation relative to a reference orientation, additional embodiments can be created by indicating that specific orientation can vary from the reference orientation by no more than 45, 40, 35, 30, 25, 20, 15, 10, 9, 8, 7, 6, 5, 4, 3, 2 or 1 degrees.

Although embodiments describe a first element as identical to a second element with respect to a specific characteristic, in other embodiments, the characteristic of the first element can different from the characteristic of the second element by no more than 25%, 20%, 15%, 10%, 9%, 8%, 7%, 6%, 5%, 4%, 3%, 2% or 1%.

When one embodiment of a connector or system is described herein as including a specific element, specific characteristic, plurality of specific elements, plurality of specific characteristics or a combination thereof; additional embodiments can be created in which the specific element, specific characteristic, plurality of specific elements, plurality of specific characteristics or a combination thereof is added to another embodiment of a connector or system described herein.

When one embodiment of a connector or system is described herein as including a specific element, specific characteristic, plurality of specific elements, plurality of specific characteristics or a combination thereof; additional embodiments can be created in which the specific element, specific characteristic, plurality of specific elements, plurality of specific characteristics or a combination thereof is substituted for a specific element, specific characteristic, plurality of specific elements, plurality of specific characteristics or a combination thereof in another embodiment of a connector or system described herein.

Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A connector comprising:
    a patterned surface and a primary track connected to the patterned surface,
    the patterned surface comprising a surface aperture pattern, the surface aperture pattern configured to receive at least one protruding element, the at least one protruding element configured to connect the connector to a first modular component;
    the primary track having a primary track void that is T-Shaped, which slidably engages with a primary track protrusion of a second modular component to connect the second modular component to the connector.

2. The connector of claim 1, the patterned surface having a length that extends in a longitudinal direction, a width that extends in a transverse direction, and a thickness that extends in a normal direction, the transverse direction being perpendicular to the longitudinal direction, the normal direction being perpendicular to the longitudinal direction and the transverse direction, the length being greater than or equal to the width, the width being greater than the thickness;
    the surface aperture pattern of the patterned surface repeating in the longitudinal direction to provide a plurality of surface aperture patterns.

3. The connector of claim 2, the connector comprising a first wall fixed to the patterned surface and extending at least partly in the normal direction.

4. The connector of claim 3, the first wall being connected to the patterned surface at a first edge of the patterned surface.

5. The connector of claim 4, the connector comprising a second wall fixed to the patterned surface and extending at least partly in the normal direction.

6. The connector of claim 5, the second wall being connected to the patterned surface at a second edge of the patterned surface, the second edge of the patterned surface being opposite the first edge of the patterned surface.

7. The connector of claim 1, the primary track comprising a primary first rounded void that is configured to slidably engage a primary first rounded protrusion.

8. The connector of claim 1, the connector comprising a secondary track, the secondary track being configured to slidably engage a secondary track protrusion.

9. The connector of claim 8, the secondary track comprising a secondary track void that is T-shaped and that is configured to slidably engage a secondary track protrusion.

10. The connector claim 8, the secondary track comprising a secondary first rounded void that is configured to slidably engage a secondary first rounded protrusion.

11. The connector of claim 1, the connector forming a channel comprising the patterned surface, a first wall and a second wall.

12. The connector of claim 1, the connector comprising a first wall and a second wall, the first wall comprising the primary track.

13. The connector of claim 12, the second wall comprising a secondary track.

14. The connector of claim 8, the surface aperture pattern of the patterned surface extending between the primary track and the secondary track, the patterned surface being connected to a first wall by the primary track, the patterned surface being connected to a second wall by the secondary track.

15. The connector of claim 14, the first wall comprising a first wall aperture pattern.

16. The connector of claim 15, the second wall comprising a second wall aperture pattern, the second wall aperture pattern being a mirror image of the first wall aperture pattern or being functionally equivalent to a mirror image of the first wall aperture pattern so that for any set of apertures comprising at least one aperture in the first wall aperture pattern, a component that can be connected to the connector by inserting at least one protrusion into the at least one aperture in the first wall aperture pattern can also be connected to the connector by inserting the at least one protrusion into at least one corresponding aperture in the second wall aperture pattern.

17. The connector of claim 14, the patterned surface comprising the primary track and the secondary track.

18. A system comprising:
the connector of claim 1,
the at least one protruding element,
and the first modular component.

19. A system comprising:
a connector having a patterned surface, and at least one track adjacent to the patterned surface;
wherein the at least one track includes a T-shaped void;
wherein the patterned surface includes a set of surface apertures;
a first modular component having a protrusion that slidably engages with the T-Shaped void of the at least one track; and
a second modular component with at least one protruding element capable of engaging with one or more of the set of surface apertures.

20. The system of claim 19, wherein the first modular component can slide longitudinally along the at least one track.

* * * * *